(12) United States Patent
Nagumo et al.

(10) Patent No.: US 8,517,878 B2
(45) Date of Patent: Aug. 27, 2013

(54) PLANETARY GEAR MECHANISM

(75) Inventors: Kouji Nagumo, Anjo (JP); Hiromichi Ota, Kariya (JP); Tomohiro Honda, Okazaki (JP); Yoshiharu Suzuki, Kariya (JP); Yoshinobu Katoh, Toyohashi (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/379,244

(22) PCT Filed: Jun. 9, 2010

(86) PCT No.: PCT/JP2010/059776
§ 371 (c)(1),
(2), (4) Date: Dec. 19, 2011

(87) PCT Pub. No.: WO2011/001802
PCT Pub. Date: Jan. 6, 2011

(65) Prior Publication Data
US 2012/0100949 A1    Apr. 26, 2012

(30) Foreign Application Priority Data

Jun. 30, 2009 (JP) ................................. 2009-155812
Feb. 24, 2010 (JP) ................................. 2010-038737

(51) Int. Cl.
*F16H 23/00* (2006.01)
(52) U.S. Cl.
USPC .......................................... 475/163; 475/341
(58) Field of Classification Search
USPC ............................ 475/163, 168, 178, 338, 341
See application file for complete search history.

(56) References Cited

U.S. PATENT DOCUMENTS

| 724,663 A | 4/1903 | Clennam |
| 3,783,712 A * | 1/1974 | Colinet .......................... 475/168 |

(Continued)

FOREIGN PATENT DOCUMENTS

| BE | 466 957 | 8/1946 |
| EP | 20314 A1 * | 12/1980 |

(Continued)

OTHER PUBLICATIONS

International Search Report Issued Aug. 17, 2010 in PCT/JP10/59776 Filed Jun. 9, 2010.

(Continued)

*Primary Examiner* — Justin Holmes
(74) *Attorney, Agent, or Firm* — Oblon, Spivak, McClelland, Maier & Neustadt, L.L.P.

(57) ABSTRACT

A planetary gear mechanism of the invention includes a housing, an input shaft that has an eccentric portion whose center lies on an eccentric axis, and is rotatable about the axis of input and output shafts relative to the housing, an oscillating face plate that eccentrically oscillates relative to the input shaft via the eccentric portion, and rotates about the eccentric axis, and an output shaft that is provided with a second internally toothed gear that internally contacts and meshes with a second externally toothed gear formed on the oscillating face plate, and is rotatable about the axis of the input and output shafts relative to the housing. The housing is formed with a first internally toothed gear that internally contacts and meshes with a first externally toothed gear formed on the oscillating face plate. As the input shaft rotates, a circumferential position at which each externally toothed gear meshes with the corresponding internally toothed gear changes, and rotation of the input shaft is transmitted at a reduced speed to the oscillating face plate, of which rotation is delivered at a further reduced speed to the output shaft.

18 Claims, 8 Drawing Sheets

(56) References Cited

U.S. PATENT DOCUMENTS

| | | | |
|---|---|---|---|
| 4,604,916 A * | 8/1986 | Distin, Jr. | 475/168 |
| 6,743,137 B2 * | 6/2004 | Rilbe | 475/163 |
| 2001/0045783 A1 | 11/2001 | Hagiike | |
| 2001/0046919 A1 | 11/2001 | Hagiike | |
| 2005/0054470 A1 * | 3/2005 | Choun | 475/163 |
| 2005/0221941 A1 * | 10/2005 | Nihei et al. | 475/178 |

FOREIGN PATENT DOCUMENTS

| | | |
|---|---|---|
| FR | 537 465 | 5/1922 |
| FR | 613 071 | 11/1926 |
| JP | 49 93765 | 9/1974 |
| JP | 49 113967 | 10/1974 |
| JP | 61 136041 | 6/1986 |
| JP | 8 74947 | 3/1996 |
| JP | 10 151540 | 6/1998 |
| JP | 2001 336586 | 12/2001 |
| JP | 2001 336587 | 12/2001 |
| JP | 2002 266955 | 9/2002 |
| JP | 2003 4106 | 1/2003 |
| JP | 2003 21198 | 1/2003 |

OTHER PUBLICATIONS

U.S. Appl. No. 13/375,087, filed Nov. 29, 2011, Nagumo, et al.
Extended European Search Report issued May 10, 2012, in Patent Application No. 10793972.0.

* cited by examiner

PLANETARY GEAR MECHANISM

TECHNICAL FIELD

The present invention relates to a planetary gear mechanism.

BACKGROUND ART

A speed reducer having a planetary gear mechanism is used for reducing the speed of rotation of a motor, for example. As one type of the planetary gear mechanism, there is widely known a planetary gear mechanism having a first shaft, an externally toothed gear mounted via an eccentric body provided on the first shaft such that the gear is eccentrically rotatable relative to the first shaft, an internally toothed gear which the externally toothed gear internally contacts and meshes with, and a second shaft coupled to the externally toothed gear via a means for transmitting only the rotational component of the externally toothed gear. As a specific example of this type of planetary gear mechanism, a cycloid differential planetary gear mechanism is known.

The speed reducer using the cycloid differential planetary gear mechanism achieves a large speed reduction ratio with one reduction stage, and operates with a high efficiency owing to a high contact ratio, as compared with an planetary gear mechanism having general gears of an involute tooth profile. On the other hand, the speed reducer of the cycloid type has a complicated mechanism for taking output out of eccentric oscillating rotation, and is likely to be available at a high cost.

A general cycloid differential planetary gear mechanism causes an epitrochoid externally toothed gear to internally contact a pin gear as an internal gear and eccentrically oscillate, so as to provide output via inner pins. In order to cancel out an imbalance due to the eccentric arrangement, an externally toothed gear having the same structure as and opposite in phase to the above-indicated externally toothed gear is added, or two pieces of externally toothed gears having the same structure and shifted in phase by 120° from each other in terms of the direction of displacement of the center are added (see Patent Document 1).

However, the known cycloid differential planetary gear mechanism has a problem that it cannot provide a large speed change ratio (reduction ratio). Therefore, in order to achieve an even larger reduction ratio (e.g., 100 or larger) with the speed reducer having the known mechanism, another stage of speed reduction mechanism or speed reduction unit must be added the upstream side of the input shaft or the downstream side of the output shaft, resulting in a significant increase in the cost and an increase in the installation space.

More specifically, the internal gear needs to be constituted by a large number of pins, so as to provide the epitrochoid gear. In the case of a small-sized speed reducer, in particular, the number of pins that can be placed on the inner periphery needs to be large. However, the diameter of each pin needs to be reduced so as to increase the number of pins. It is practically impossible or quite difficult to make this choice, eventually making it impossible to realize a structure that provides a large reduction ratio.

PRIOR ART DOCUMENT

Patent Document
  Patent Document 1: JP-A-2002-266955

DISCLOSURE OF THE INVENTION

Object to be Attained by the Invention
  The present invention has been developed in view of the above-described actual situations, and an object of the invention is to provide a planetary gear mechanism that can achieve a large speed change ratio and also achieve reduction in size.

Arrangement for Attaining the Object

To attain the above object, a planetary gear mechanism of the invention is characterized by comprising a first member having a first internally toothed gear formed on an inner circumferential surface thereof, a second member that has a second internally toothed gear formed on an inner circumferential surface thereof, and is rotatable relative to the first member about an axis of input and output shafts, an oscillating member that is formed in an annular shape, and includes a first externally toothed gear that is formed in an outer circumferential surface thereof to be able to mesh with the first internally toothed gear, and a second externally toothed gear that is formed in the outer circumferential surface to be able to mesh with the second internally toothed gear, such that the number of teeth of the first externally toothed gear is smaller than the number of teeth of the first internally toothed gear, and the number of teeth of the second externally toothed gear is smaller than the number of teeth of the second internally toothed gear, the oscillating member being formed so as to oscillate relative to the first member and the second member, so that only a circumferential portion of the first externally toothed gear meshes with the first internally toothed gear, and only a circumferential portion of the second externally toothed gear meshes with the second internally toothed gear, and a third member including an eccentric portion having an outer circumferential surface whose center is displaced from the axis of input and output shafts, the eccentric portion supporting an inner circumferential surface of the oscillating member and rotating about the axis of input and output shafts so as to oscillate the oscillating member, or being rotated about the axis of input and output shafts due to oscillation of the oscillating member. In operation, driving force is applied to the third member to oscillate and rotate the oscillating member, and move a circumferential position at which the first externally toothed gear and the first internally toothed gear mesh with each other, and a circumferential position at which the second externally toothed gear and the second internally toothed gear mesh with each other, so that the driving force is delivered at a reduced speed to at least one of the first member and the second member, or driving force is applied to at least one of the first member and the second member so as to move a circumferential position at which the first externally toothed gear and the first internally toothed gear mesh with each other, and a circumferential position at which the second externally toothed gear and the second internally toothed gear mesh with each other, and oscillate and rotate the oscillating member, so that the driving force is delivered at an increased speed to the third member.

The planetary gear mechanism of the invention which is characterized in that one of the first externally toothed gear and the first internally toothed gear comprises first pins that extend in a direction of the axis of input and output shafts.

The planetary gear mechanism of the invention which is characterized in that one of the second externally toothed gear and the second internally toothed gear comprises second pins that extend in a direction of the axis of input and output shafts.

The planetary gear mechanism of the invention which is characterized in that the other of each of the externally toothed gears and each of the internally toothed gears is formed with a trochoid tooth profile.

The planetary gear mechanism of the invention which is characterized in that a central axis of the first externally toothed gear and a central axis of the second externally toothed gear are provided on the same axis.

The planetary gear mechanism of the invention which is characterized in that each of the first pins has a pin body, and a collar rotatably fitted on the pin body.

The planetary gear mechanism of the invention which is characterized in that each of the second pins has a pin body, and a collar rotatably fitted on the pin body.

The planetary gear mechanism of the invention which is characterized in that a first support bearing is disposed between the eccentric portion and the oscillating member.

The planetary gear mechanism of the invention which is characterized in that a part of the second member is inserted in a central portion of the third member, and a second support bearing is disposed between the third member and the part of the second member inserted in the third member.

The planetary gear mechanism of the invention which is characterized in that the second support bearing is disposed between the eccentric portion of the third member and the part of the second member inserted in the third member.

The planetary gear mechanism of the invention which is characterized in that the planetary gear mechanism is a speed reducing mechanism in which the third member serves as an input shaft, and the second member serves as an output shaft.

The planetary gear mechanism of the invention which is characterized in that the first member is a housing that rotatably supports the second member and the third member, that the second member is an output shaft that delivers driving force applied to the third member, at a reduced speed, and that the first internally toothed gear is formed by the first pins that protrude from the first member, and the second externally toothed gear is formed by the second pins that protrude from the oscillating member.

The planetary gear mechanism of the invention which is characterized in that the first member is a housing that rotatably supports the second member and the third member, that the second member is an output shaft that delivers driving force applied to the third member, at a reduced speed, and that the first externally toothed gear is formed by the first pins that protrude from the oscillating member, and the second internally toothed gear is formed by the second pins that protrude from the second member.

The planetary gear mechanism of the invention which is characterized in that the third member has a counter balancer that cancels out unbalanced rotation of the eccentric portion.

The planetary gear mechanism of the invention which is characterized in that the counter balancer comprises a weight reducing hole formed by partially hollowing the third member.

The planetary gear mechanism of the invention which is characterized in that the second member is rotatably supported by the first member via a third support bearing, and that an inner ring of the third support bearing is formed integrally with the second member.

The planetary gear mechanism of the invention which is characterized in that the third member is driven by an electric motor, that a case of the electric motor is formed integrally with the first member or the second member, and that an output shaft of the electric motor is formed integrally with the third member.

A planetary gear mechanism of the invention, which includes a fixed housing that supports an input shaft and an output shaft such that the input shaft and the output shaft are rotatable about a common axis of the input and output shafts, a first shaft that is one of the input shaft and the output shaft, and has an eccentric portion whose center lies on an eccentric axis that is displaced from the axis of the input and output shafts, a second shaft that is the other of the input shaft and the output shaft, and is provided with a second internally toothed gear, and an oscillating member that is formed with a cylindrical portion supported by the eccentric portion, a first externally toothed gear that engages with a first internally toothed gear formed on the housing and having a center on the axis of the input and output shafts, and a second externally toothed gear that engages with the second internally toothed gear, such that the number of teeth of the first externally toothed gear is smaller than the number of teeth of the first internally toothed gear, and the number of teeth of the second externally toothed gear is smaller than the number of teeth of the second internally toothed gear, the oscillating member being formed so as to rotate with respect to the eccentric axis and oscillate relative to the housing and the second shaft, so that only a circumferential portion of the first externally toothed gear meshes with the first internally toothed gear, and only a circumferential portion of the second externally toothed gear meshes with the second internally toothed gear, is characterized in that the first internally toothed gear comprises first pins that protrude from the housing and extend in a direction of the axis of the input and output shafts, that the second externally toothed gear comprises second pins that protrude from the oscillating member and extend in the direction of the axis of the input and output shafts, and that driving force is applied to the first shaft to oscillate and rotate the oscillating member, and move a circumferential position at which the first externally toothed gear and the first internally toothed gear mesh with each other and a circumferential position at which the second externally toothed gear and the second internally toothed gear mesh with each other, so that the driving force is delivered at a reduced speed to the second shaft, or driving force is applied to the second shaft to move a circumferential position at which the first externally toothed gear and the first internally toothed gear mesh with each other and a circumferential position at which the second externally toothed gear and the second internally toothed gear mesh with each other, and oscillate and rotate the oscillating member, so that the driving force is delivered at an increased speed to the first shaft.

A planetary gear mechanism of the invention, which includes a fixed housing that supports an input shaft and an output shaft such that the input shaft and the output shaft are rotatable about a common axis of the input and output shafts, a first shaft that is one of the input shaft and the output shaft, and has an eccentric portion whose center lies on an eccentric axis that is displaced from the axis of the input and output shafts, a second shaft that is the other of the input shaft and the output shaft, and is provided with a second internally toothed gear, and an oscillating member that is formed with a cylindrical portion supported by the eccentric portion, a first externally toothed gear that engages with a first internally toothed gear formed on the housing and having a center on the axis of the input and output shafts, and a second externally toothed gear that engages with the second internally toothed gear, such that the number of teeth of the first externally toothed gear is smaller than the number of teeth of the first internally toothed gear, and the number of teeth of the second externally toothed gear is smaller than the number of teeth of the second internally toothed gear, the oscillating member being formed so as to rotate with respect to the eccentric axis and oscillate relative to the housing and the second shaft, so that only a circumferential portion of the first externally toothed gear meshes with the first internally toothed gear, and only a circumferential portion of the second externally toothed gear meshes with the second internally toothed gear, is characterized in that the first externally toothed gear comprises first pins that protrude from the oscillating member and extend in a direction of the axis of the input and output shafts, that the second internally toothed gear comprises second pins that protrude from the second shaft and extend in the direction of the axis of the input and output shafts, and that driving force is applied to the first shaft to oscillate and rotate the oscillating member, and move a circumferential position at which the first externally toothed gear and the first internally toothed gear mesh with each other and a circumferential position at which the second externally toothed gear and the second internally toothed gear mesh with each other, so that the driving force is delivered at a reduced speed to the second shaft, or driving force is applied to the second shaft to move a circumferential position at which the first externally toothed gear and the first internally toothed gear mesh with each other and a circumferential position at which the second externally toothed gear and the second internally toothed gear mesh with each other, and oscillate and rotate the oscillating member, so that the driving force is delivered at an increased speed to the first shaft.

Effects of the Invention

In the planetary gear mechanism of the invention, as the third member as one of the input and output shafts rotates, the oscillating member eccentrically oscillates via the eccentric portion provided on the third member, and undergoes rotary motion about the eccentric axis. The oscillating member is formed with the first externally toothed gear that engages with (externally contacts and meshes with) the first internally toothed gear formed on the first member, and the rotational speed of the rotary motion about the axis of the input and output shafts (the central axis of the third member) is changed to the speed corresponding to the speed change ratio determined by the number of teeth of the first externally toothed gear and that of the first internally toothed gear.

The oscillating member is also formed with the second externally toothed gear that engages with (externally contacts and meshes with) the second internally toothed gear provided on the second member as the other of the input and output shafts. The oscillating member eccentrically oscillates and rotates at the speed to which the rotational speed has been changed by the first gear set (the first externally toothed gear and the first internally toothed gear), and the rotational speed of the eccentric oscillating rotation is changed to the speed corresponding to the speed change ratio determined by the number of teeth of the second externally toothed gear and that of the second internally toothed gear. Here, the second externally toothed gear is formed on the oscillating member, and the rotation whose speed has been changed by the second gear set (the second externally toothed gear and the second internally toothed gear) is delivered to the second member via the second internally toothed gear. Thus, in the planetary gear mechanism of the invention, the rotational speed at which the third member rotates is changed by both of the first gear set and the second gear set, and the resulting rotation is delivered from the second member. The oscillating member rotates in the direction opposite to that of the third member, and the second member rotates in the direction opposite to that of the oscillating member. Also, the planetary gear mechanism of the invention may change the speed of rotation of the second member and deliver it to the third member. In this case, the rotation is transmitted via the second member, the second internally toothed gear, the second externally toothed gear, the first internally toothed gear, the first externally toothed gear, the oscillating member, and the third member, in the order of description, so that the speed of the rotation is changed.

Thus, the planetary gear mechanism of the invention is constructed such that the rotational speed that has been changed by one of the first and second gear sets is further changed by the other gear set. With this arrangement, a large speed change ratio can be obtained by adjusting the speed ratios or gear ratios of the first gear set and the second gear set. In this connection, the speed ratio (reduction ratio) of each of the gear sets can be determined by adjusting the numbers of teeth of the externally toothed gear and internally toothed gear that constitute each of the gear sets.

Also, the planetary gear mechanism of the invention is constructed such that the two gear sets that change the speed are formed as a unit, to thus provide a speed reducer that is small in size but provides high torque and a large reduction ratio, which advantageously contributes to reduction in the size of the system. In particular, the first and second externally toothed gears are formed integrally on the oscillating member, so that the axial length of the oscillating member can be advantageously shortened, and the overall size of the planetary gear mechanism can be advantageously reduced.

In the planetary gear mechanism of the invention, high machining or working accuracy is required in formation of only the engaging faces of the first and second externally toothed gears provided on the oscillating member and the internally toothed gears engaging with the respective externally toothed gears (the meshing faces of the gears). In other words, high machining or working accuracy is not required in formation of the other portions. Thus, the planetary gear mechanism of the invention exerts a cost reduction effect.

In the known planetary gear mechanism, the inner pin holes through which the inner pins extend need to be formed in the externally toothed gear, and there is a limitation to reduction of the outside diameter of the externally toothed gear itself. On the other hand, the planetary gear mechanism of the invention, in which two externally toothed gears are provided on the oscillating face plate (that functions equally with the externally toothed gear), does not use any component that requires large space, like the inner pin holes. Consequently, the outside diameter can be advantageously reduced.

In the planetary gear mechanism of the invention one of the gears of one gear set can be formed by the pins. Thus, the one gear can be easily produced. Furthermore, since highly accurate parts that provide the pins can be produced at a low cost, the planetary gear mechanism of the invention exerts a cost reduction effect. Here, each of the pins extends in the direction of the axis of the input and output shafts, so as to be able to mesh with the mating gear. More preferably, each pin extends in a direction perpendicular to the oscillating face.

In the planetary gear mechanism of the invention, the other gear of one gear set is formed with the trochoid tooth profile, so that the area of meshing between the externally toothed gear and internally toothed gear that constitute the gear set can be increased. The trochoid tooth profile of the externally toothed gear is preferably an epitrochoid tooth profile, and that of the internally toothed gear is preferably a hypotrochoid tooth profile.

In the planetary gear mechanism of the invention, the two externally toothed gears of the two gear sets are provided on the same axis; therefore, the oscillating member that eccentrically oscillates and rotates can be shared by the two gear sets, and the number of components is prevented from being increased.

In the planetary gear mechanism of the invention, each of the first pins and second pins consists of a pin body and a collar. Namely, the meshing face of the pin with the mating gear is formed by the surface of the collar. The collar is arranged to be rotatable relative to the pin body; therefore, when the pins and the mating gear mesh with each other, slipping of the meshing faces can be absorbed by the rotating collars, thus assuring highly efficient meshing.

Furthermore, a backlash in meshing can be easily adjusted by adjusting the outside diameter of the collar.

In the planetary gear mechanism of the invention, the first support bearing is disposed between the eccentric portion and the oscillating member, so that eccentric rotation of the eccentric portion can be converted into oscillating rotation of the oscillating member. Also, the eccentric portion can receive radial stress applied to the oscillating member.

In the planetary gear mechanism of the invention, the axial positions of the third member and the second member coincide with each other, and the second support bearing is disposed between these members. With this arrangement, stresses (reaction force produced upon meshing) applied radially inwards from the first and second internally toothed gears to the first and second externally toothed gears, respectively, are transmitted to the second member via the oscillating member, the first support bearing, the eccentric portion of the third member and the second support bearing. With the second member thus receiving the stresses (reaction force) transmitted thereto, transmission of rotation in each gear set is accomplished without loss.

In the planetary gear mechanism of the invention, the second support bearing is disposed between the eccentric portion of the third member and the second member, so that the stress applied radially inwards to the eccentric portion can be received by the second member.

The planetary gear mechanism of the invention is preferably a speed reducing mechanism that reduces the speed of the input from the third member and delivers it to the second member, since the speed can be changed with the mechanism that is available at a low cost and is small in size. As described above, the planetary gear mechanism of the invention is available at a low cost and can be small-sized; therefore, it is preferable to use the planetary gear mechanism as a speed reducer for reducing the speed of the output of a motor in a robot, for example.

In the planetary gear mechanism of the invention, the first internally toothed gear is formed by the first pins that protrude from the first member, so that the first externally toothed gear that meshes with the first internally toothed gear can be formed by cutting the outer peripheral edge of the oscillating member. Thus, the first externally toothed gear can be easily formed by cutting through the oscillating member.

Also, the second externally toothed gear is formed by the second pins that protrude from the oscillating member; therefore, even when the second externally toothed gear has a smaller diameter than the first externally toothed gear, the oscillating member need not be formed by machining with a pocket or a hollow portion, unlike the case where the gear is formed by cutting, thus assuring easy production thereof.

In the planetary gear mechanism of the invention, the first externally toothed gear is formed by the first pins that protrude from the oscillating member; so that the first internally toothed gear that meshes with the first externally toothed gear can be formed by cutting on the first member. Thus, the first internally toothed gear can be formed by cutting through a wall of the first member as the housing, thus assuring easy production thereof.

Also, the second internally toothed gear is formed by the second pins that protrude from the second member. When the second internally toothed gear is formed on the second member, therefore, the second member need not be formed by machining with a pocket or a hollow portion, thus assuring each production thereof.

In the planetary gear mechanism of the invention, the third member has a counter balancer that cancels out unbalanced rotation of the eccentric portion. With this arrangement, the unbalanced rotation caused by the eccentric portion can be cancelled out, and vibration of the planetary gear mechanism can be suppressed. It is to be understood that the construction of the counter balancer is not particularly limited provided that the shape and position of the counter balancer are determined so that it can cancel out the unbalanced rotation of the eccentric portion.

In the planetary gear mechanism of the invention, the counter balancer is in the form of a weight reducing hole formed by partially hollowing the third member. Thus, the eccentric imbalance load of the third member can be eliminated without increasing the number of components.

In the planetary gear mechanism of the invention, the inner ring of the third support bearing is formed integrally with the second member, so that the number of components can be reduced, and the planetary gear mechanism is available at a reduced cost.

In the planetary gear mechanism of the invention, the case of the electric motor is formed integrally with the first member or the second member, and the output shaft of the electric motor is formed integrally with the third member, so that the number of components can be reduced, and the planetary gear mechanism is available at a reduced cost.

In the planetary gear mechanism of the invention, as the first shaft as one of the input and output shaft rotates, the oscillating member eccentrically oscillates via the eccentric portion provided on the first shaft, and undergoes rotary motion about the eccentric axis. The oscillating member is formed with the first externally toothed gear that engages with (externally contacts and meshes with) the first internally toothed gear formed by the first pins that protrude from the housing, and the rotational speed of the rotary motion about the axis of the input and output shafts (the central axis of the first shaft) is changed to the speed corresponding to the speed change ratio determined by the number of teeth of the first externally toothed gear and that of the first internally toothed gear.

The second pins, which protrude from the oscillating member, form the second externally toothed gear that engages with (externally contacts and meshes with) the second internally toothed gear provided on the second shaft as the other of the input and output shafts. The oscillating member eccentrically oscillates and rotates at the speed to which the speed has been changed by the first gear set (the first externally toothed gear and the first internally toothed gear), and the rotational speed of the eccentric oscillating rotation is changed to the speed corresponding to the speed change ratio determined by the number of teeth of the second externally toothed gear and that of the second internally toothed gear. Here, the second externally toothed gear is formed on the oscillating member, and the rotation whose speed has been changed by the second gear set (the second externally toothed gear and the second internally toothed gear) is delivered to the second shaft via the second internally toothed gear. Thus, in the planetary gear mechanism of the invention, the speed of rotation of the first shaft is changed by both of the first gear set and the second gear set, and the resulting rotation is taken out or delivered from the second shaft. The oscillating member rotates in the direction opposite to that of the first shaft, and the second shaft rotates in the direction opposite to that of the oscillating member. Also, the planetary gear mechanism of the invention may change the speed of rotation of the second shaft, and deliver the rotation to the first shaft. In this case, the rotation is transmitted via the second shaft, the second internally toothed gear, the second externally toothed gear, the first internally toothed gear, the first externally toothed gear, the oscillating member, and the first shaft, in the order of description, so that the speed is changed.

Thus, the planetary gear mechanism of the invention is constructed such that the rotational speed that has been changed by one of the first and second gear sets is further changed by the other gear set. With this arrangement, a large speed change ratio can be obtained by adjusting the speed ratios or gear ratios of the first gear set and the second gear set. In this connection, the speed ratio (reduction ratio) of each of the gear sets can be determined by adjusting the numbers of teeth of the externally toothed gear and internally toothed gear that constitute each of the gear sets.

Also, the first internally toothed gear is formed by the first pins that protrude from the housing, so that the first externally toothed gear that meshes with the first internally toothed gear can be formed by cutting the outer peripheral edge of the oscillating member. Thus, the first externally toothed gear can be easily formed by cutting through the oscillating member.

Also, the second externally toothed gear is formed by the second pins that protrude from the oscillating member; therefore, even when the second externally toothed gear has a smaller diameter than the first externally toothed gear, the oscillating member need not be formed by machining with a pocket or a hollow portion, unlike the case where the gear is formed by cutting, thus assuring easy production thereof.

In the planetary gear mechanism of the invention, as the first shaft as one of the input and output shaft rotates, the oscillating member eccentrically oscillates via the eccentric portion provided on the first shaft, and undergoes rotary motion about the eccentric axis. The first pins, which protrude from the oscillating member, form the first externally toothed gear that engages with (externally contacts and meshes with) the first internally toothed gear formed on the housing, and the rotational speed of the rotary motion about the axis of the input and output shafts (the central axis of the first shaft) is changed to the speed corresponding to the speed change ratio determined by the number of teeth of the first externally toothed gear and that of the first internally toothed gear.

The oscillating member is formed with the second externally toothed gear that engages with (externally contacts and meshes with) the second internally toothed gear formed by the second pins that protrude from the second shaft as the other of the input and output shafts. The oscillating member eccentrically oscillates and rotates at the speed to which the speed has been changed by the first gear set (the first externally toothed gear and the first internally toothed gear), and the rotational speed of the eccentric oscillating rotation is changed to the speed corresponding to the speed change ratio determined by the number of teeth of the second externally toothed gear and the number of teeth of the second internally toothed gear. Here, the second externally toothed gear is formed on the oscillating member, and the rotation whose speed has been changed by the second gear set (the second externally toothed gear and the second internally toothed gear) is delivered to the second shaft via the second internally toothed gear. Thus, in the planetary gear mechanism of the invention, the speed of rotation of the first shaft is changed by both of the first gear set and the second gear set, and the resulting rotation is taken out or delivered from the second shaft. The oscillating member rotates in the direction opposite to that of the first shaft, and the second shaft rotates in the direction opposite to that of the oscillating member. Also, the planetary gear mechanism of the invention may change the speed of rotation of the second shaft, and deliver the rotation to the first shaft. In this case, the rotation is transmitted via the second shaft, the second internally toothed gear, the second externally toothed gear, the first internally toothed gear, the first externally toothed gear, the oscillating member, and the first shaft, in the order of description, so that the speed of the rotation is changed.

Thus, the planetary gear mechanism of the invention is constructed such that the rotational speed that has been changed by one of the first and second gear sets is further changed by the other gear set. With this arrangement, a large speed change ratio can be obtained by adjusting the speed ratios or gear ratios of the first gear set and the second gear set. In this connection, the speed ratio (reduction ratio) of each of the gear sets can be determined by adjusting the numbers of teeth of the externally toothed gear and internally toothed gear that constitute each of the gear sets.

Also, the first externally toothed gear is formed by the first pins that protrude from the oscillating member, so that the first internally toothed gear that meshes with the first externally toothed gear can be formed by cutting through the housing, thus assuring easy production thereof.

Also, the second internally toothed gear is formed by the second pins that protrude from the second shaft; therefore, when the second internally toothed gear is formed on the second shaft, the second shaft need not be formed by machining with a pocket or a hollow portion, thus assuring easy production thereof.

BEST MODES FOR CARRYING OUT THE INVENTION

<First Embodiment>

Figure 1:
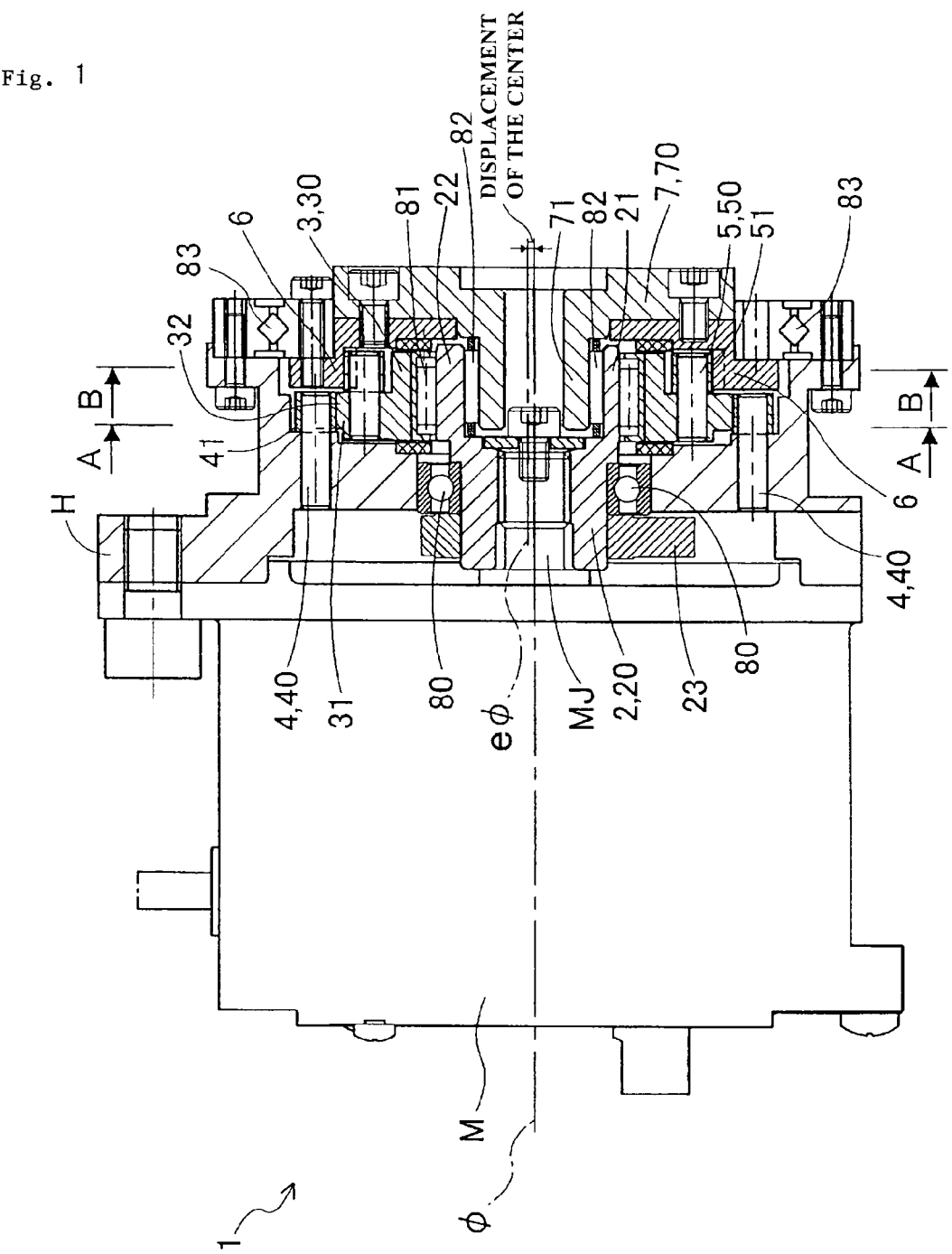
FIG. 1 is a cross-sectional view showing the construction of a speed reducer of a first embodiment.
Figure 2:
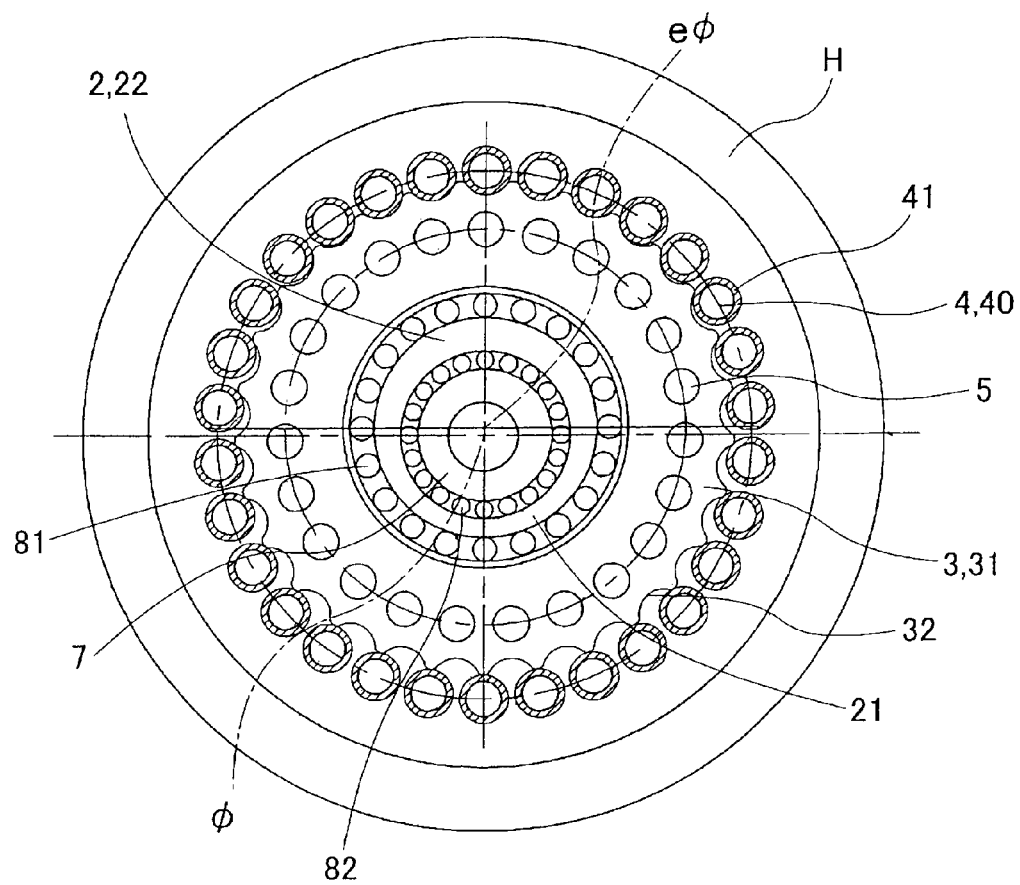
FIG. 2 is a cross-sectional view taken along an A-A section of FIG. 1.
Figure 3:
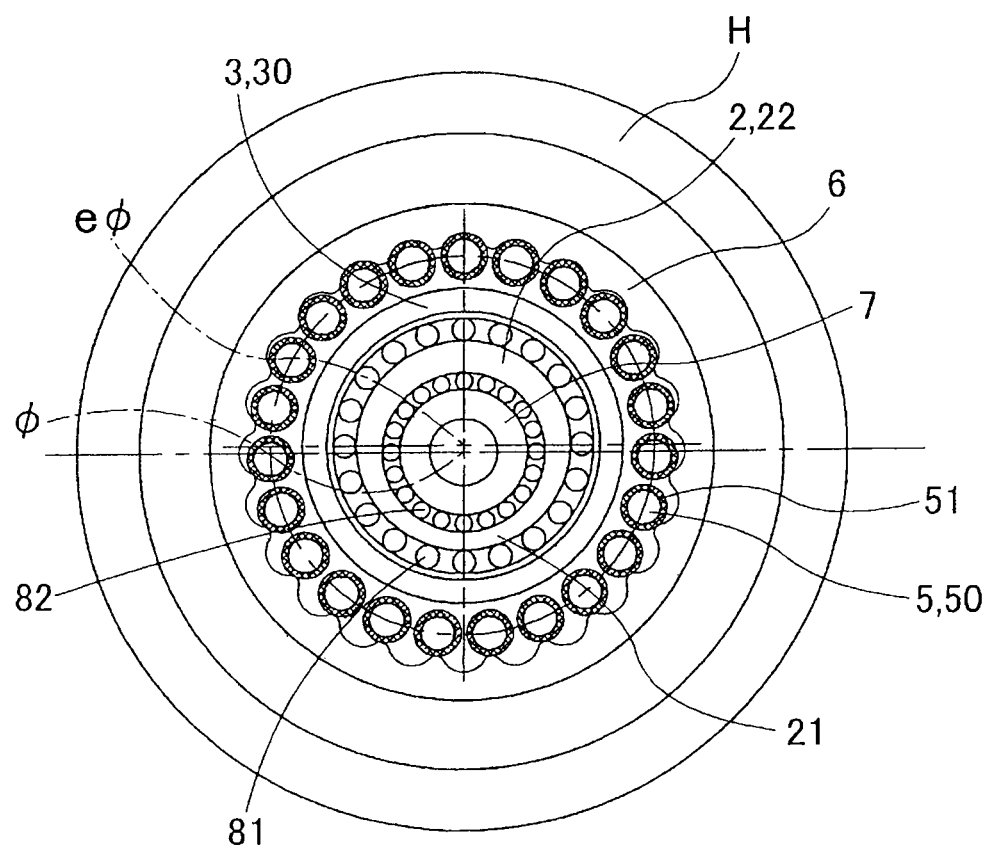
FIG. 3 is a cross-sectional view taken along a B-B section of FIG. 1.

In the following, a first embodiment will be described with reference to FIG. 1 through FIG. 5. FIG. 1 shows a speed reducer in which an planetary gear mechanism of this embodiment is employed. In the speed reducer 1 of this embodiment, driving force applied from a motor M to an input shaft 2 is delivered to an output shaft 7 while its speed is reduced. In order to illustrate rotation of the input shaft and the phases of gears, an A-A section in FIG. 1 is shown in FIG. 2, and a B-B section in FIG. 1 is shown in FIG. 3, respectively.

The speed reducer 1 of this embodiment has the motor M, a housing H, the input shaft 2, an oscillating face plate 3, first pins 4, second pins 5, an internally toothed gear 6, and the output shaft 7.

The motor M (corresponding to the electric motor of this invention) is a member that produces a rotation output. In this embodiment, the motor M is not particularly limited.

The housing H (corresponding to the first member of the invention) is a member that is fixed to the motor M, and forms a part of the outer peripheral shape of the speed reducer 1. Also, the housing H rotatably houses and supports members, such as a rotary shaft MJ of the motor M, the input shaft 2 (corresponding to the third member and first shaft of the invention), the oscillating face plate 3 (corresponding to the oscillating member of the invention), the first pins 4, the second pins 5, the internally toothed gear 6, and the output shaft 7 (corresponding to the second member and second shaft of the invention when it includes the internally toothed gear 6). The housing H rotatably supports the input shaft 2 and the output shaft 7 such that the axes of these shafts coincide with each other and provide a common axis (which is the axis of input and output shafts and is denoted by φ in the figures).

The input shaft 2 is a generally cylindrical member fixed to the rotary shaft MJ of the motor M. The input shaft 2 has a reduced-diameter portion 20 that is fitted on and fixed to the rotary shaft MJ of the motor M, and a cylindrical increased-diameter portion 21 that is located on the side of the distal side of the reduced-diameter portion 20 and has larger inside diameter and larger outside diameter than those of the reduced-diameter portion 20. The reduced-diameter portion 20 and the increased-diameter portion 21 are formed such that their inner and outer diameters change gradually (in steps), as shown in FIG. 1.

The reduced-diameter portion 20 is placed in a rotatable condition, with an input shaft supporting bearing 80 interposed between the reduced-diameter portion 20 and the housing H.

The increased-diameter portion 21 includes an eccentric portion 22 having a radially outer circumferential surface that has an eccentric shape with its center displaced from the center of the input shaft 2. Namely, as the input shaft 2 rotates about the axis of the input and output shafts, the eccentric portion 22 also rotates about the axis of the input and output shafts so that the outer circumferential surface of the eccentric portion 22 oscillates. The outer circumferential surface of the eccentric portion 22 is formed in the shape of a true circle whose center lies on an eccentric axis (denoted by eφ in the figures) located at a different position from the axis of the input and output shafts.

Figure 4:
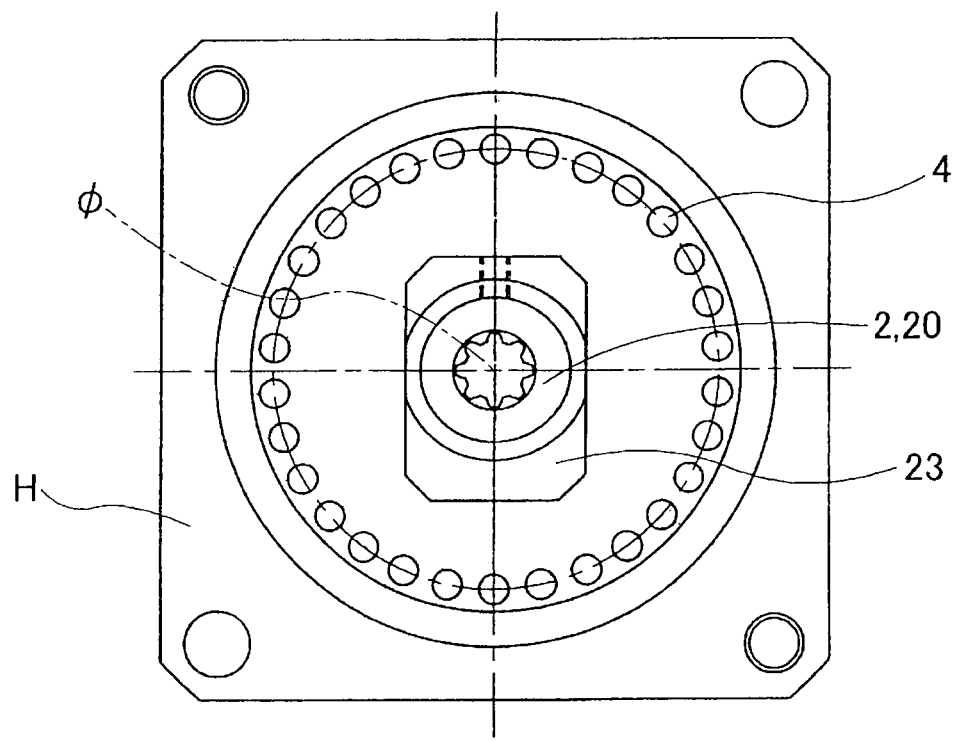
FIG. 4 is a view showing a counter balancer of the speed reducer of the first embodiment.

The input shaft 2 is provided with a counter balancer 23 located closer to the motor M than a portion of the reduced-diameter portion 20 which is supported by the housing H. The counter balancer 23 is positioned so as to cancel out unbalanced rotation produced by the eccentric portion 22. More specifically, the counter balancer 23 is mounted such that its phase is opposite to that of the eccentric shape of the eccentric portion 22, as shown in FIG. 4. FIG. 4 is a schematic view as seen from the output shaft 7 side toward the motor M, which makes a phase difference between the oscillating face plate 3 and the counter balancer 23 understood.

The oscillating face plate 3 is a disc-like member in which (the eccentric portion 22 of) the increased-diameter portion 21 is inserted via a first support bearing 81. In this embodiment, the oscillating face plate 3 has a cylindrical portion 30 in which (the eccentric portion 22 of) the increased-diameter portion 21 is inserted via the first support bearing 81, and a disc-shaped disc portion 31 that extends perpendicularly to the axial direction at one end portion of the cylindrical portion 30 closer to the motor M. The cylindrical portion 30 is supported by the eccentric portion 22 via the first support bearing 81. The oscillating face plate 3 is formed at its outer circumferential surface with a first externally toothed gear 32 that engages with a first internally toothed gear formed on the housing H and having a center located on the axis of the input and output shafts, and a second externally toothed gear that engages with the second internally toothed gear 6. The oscillating face plate 3 rotates with respect to the eccentric axis, and the eccentric axis rotates about the axis of the input and output shafts, due to the engagement of the respective internally toothed gears with the corresponding externally toothed gears.

In an end portion of the disc portion 31 of the oscillating face plate 3, the externally toothed gear 32 of the epitrochoid type is formed in the circumferential direction, with a predetermined pitch (the number of teeth is 29 in this embodiment). The externally toothed gear 32 corresponds to the first externally toothed gear of the invention.

Also, a plurality of second pins 5 (23 pins in this embodiment) are fixed at equal intervals to the disc portion 31 of the oscillating face plate 3. The second pins 5 are fixed to one surface of the disc portion 31 of the oscillating face plate 3 so as to protrude in a direction (direction of the axis of the input and output shafts) away from the motor M. The pins 5 form an externally toothed gear corresponding to the second externally toothed gear of the invention.

Each of the second pins 5 consists of a columnar pin body 50 fixed to the oscillating face plate 3, and a cylindrical collar 51 rotatably fitted on the pin body 50, as shown in FIG. 1.

Only a circumferential portion of the externally toothed gear 32 of the disc portion 31 of the oscillating face plate 3 meshes with the internally toothed gear. The internally toothed gear corresponds to the first internally toothed gear of the invention. The internally toothed gear is formed at the inner circumferential surface of the housing H by the first pins 4 fixed to the housing H. The first pins 4 are fixed in a condition where they extend in parallel with the axial direction of the input shaft 2 and the output shaft 7 (the direction of the axis of the input and output shafts). A plurality of pins (in this embodiment, 30 pins that is larger by one than the number of the meshing external teeth) as the first pins 4 are fixed at equal intervals (equal pitches). As the oscillating face plate 3 undergoes oscillating rotary motion, the first pins 4 engage (mesh) with the externally toothed gear 32 formed on the end portion of the disc portion 31. The externally toothed gear 32 (the first externally toothed gear) and the second externally toothed gear consisting of the second pins 5 are both formed about the eccentric axis, coaxially with each other.

Each of the first pins 4 consists of a columnar pin body 40 fixed to the housing H, and a cylindrical collar 41 rotatably fitted on the pin body 40, as shown in FIG. 1.

The internally toothed gear 6 is formed radially outwardly of the second pins 5 fixed to the disc portion 31 of the oscillating face plate 3 (in a direction away from the center of the disc portion 31), such that only a circumferential portion of the internally toothed gear 6 internally contacts and meshes with the externally toothed gear formed by the second pins 5. The internally toothed gear 6 having teeth on its inner circumferential surface corresponds to the second internally toothed gear of the invention. The internally toothed gear 6 is fixed to the output shaft 7. In the internally toothed gear 6, internal teeth of the hypotrochoid type are formed at a predetermined pitch (in this embodiment, the number of the teeth is 24, which is larger by one than the number of the meshing external teeth).

The output shaft 7 consists of a disc-shaped portion 70 shaped like a disc, and an insert portion 71 that protrudes from the disc-shaped portion 70 toward the motor M and is inserted into the center of the increased-diameter portion 21 of the input shaft 2. The output shaft 7 is supported by the housing H via an output shaft supporting bearing 83, such that the output shaft 7 is rotatable about the axis of the input and output shafts.

While the insert portion 71 of the output shaft 7 is inserted into the center of the increased-diameter portion 21 of the input shaft 2, the insert portion 71 is mounted with a second support bearing 82 interposed between the insert portion 71 and the inner circumferential surface of the increased-diameter portion 21.

Next, the operation of the speed reducer 1 of this embodiment will be described.

Initially, the motor M is operated. The input shaft 2 rotates via the rotary shaft MJ of the motor M. As the input shaft 2 rotates, the eccentric portion 22 that constitutes the input shaft 22 rotates, so that its outer circumferential surface oscillates (eccentric rotation). Since the input shaft 2 is provided with the counter balancer 23, an imbalance in rotation which is caused by the eccentric rotation of the eccentric portion 22 is cancelled out or eliminated.

The eccentric rotation of the eccentric portion 22 causes the oscillating face plate 3 to eccentrically oscillate via the first support bearing 81, and make rotary motion (eccentrically oscillating motion) about the eccentric axis. The oscillating face plate 3 has external teeth of the epitrochoid type formed on the outer periphery of the disc portion 31, and only a circumferential portion of the externally toothed gear meshes with the first pins 4 at this time. The oscillating face plate 3 oscillates relative to the housing H, and a circumferential position at which the external teeth and the first pins 4 fixed to the housing H mesh with each other moves, so that the oscillating face plate 3 is rotated in a direction opposite to the direction of rotation of the input shaft 2, about the eccentric axis, while its speed is reduced. The speed reduction ratio is determined by the numbers of teeth of the meshing gears.

The second pins 5 are fixed to the oscillating face plate 3 that is rotated at a reduced speed, and each of the second pins 5 eccentrically oscillates and rotates along with the oscillating face plate 3. The second pins 5 mesh with only a circumferential portion of the internally toothed gear 6, and a circumferential position at which the second pins 5 mesh with the internally toothed gear 6 moves, so that the rotational speed is (relatively) reduced, owing to the difference in the number of teeth. This is similar to the reduction of the speed in a first gear set consisting of the above-mentioned first externally toothed gear and first internally toothed gear.

With the second pins 5 fixed to the oscillating face plate 3, the rotation whose speed has been reduced causes the internally toothed gear 6 to rotate in a direction opposite to the direction of rotation of the oscillating face plate 3, about the axis of the input and output shafts. This rotation is transmitted to the output shaft 7 to which the internally toothed gear 6 is fixed, and is taken out by the output shaft 7 as rotation resulting from further reduction of the speed of rotation of the oscillating face plate 3 and having the same direction as that of rotation of the input shaft 2.

Thus, the speed reducer 1 of this embodiment changes the speed of rotation of the input shaft 2 using two gear sets, and the resulting rotation is delivered from the output shaft 7. The speed can be reduced at a large reduction ratio in each of the two gear sets, resulting in a further large reduction ratio at which rotation output can be obtained. Namely, the speed reducer 1 of the invention is a small-sized speed reducer that provides high torque and a large reduction ratio.

In the speed reducer 1 of this embodiment, high machining or working accuracy is required in formation of only the externally toothed gear 32 provided on the oscillating face plate 3, the first pins 4 that form contact faces of the internally toothed gear, the second pins 5 fixed to the oscillating face plate 3, and the meshing faces of the internally toothed gear 6. In other words, high machining or working accuracy is not required in formation of the other portions. Namely, the working cost can be advantageously reduced.

In the known planetary gear mechanism, the inner pin holes through which the inner pins extend are required to be formed in the externally toothed gear, and there is a limitation to reduction of the outside diameter of the externally toothed gear itself. On the other hand, the planetary gear mechanism of the invention, in which two externally toothed gears are provided on the oscillating face plate (that functions equally with the externally toothed gear), does not use components, like the inner pin holes, which require large space. Consequently, the outside diameter can be advantageously reduced.

In the speed reducer 1 of this embodiment, the two externally toothed gears are coaxially formed on the single oscillating face plate 3, so that the gears undergo the same eccentric oscillating rotation. Thus, the speed reducer 1 can be simply constructed, thus providing an effect of preventing increase in the number of components.

Also, in the planetary gear mechanism of the speed reducer 1 of this embodiment, the input shaft 2 has the counter balancer 23 that cancels out unbalanced rotation of the eccentric portion 22, on the motor M side, so that the unbalanced rotation caused by the eccentric portion 22 is cancelled out by the counter balancer 23. Namely, in the planetary gear mechanism of the speed reducer 1 of this embodiment, the speed reducer 1 is less likely or unlikely to vibrate. Furthermore, since the counter balancer 23 having a simple shape can be used in the planetary gear mechanism of the speed reducer 1 of this embodiment, the working cost can be advantageously reduced.

Also, in the planetary gear mechanism of the speed reducer 1 of this embodiment, the meshing faces of the first pins 4 and the second pins 5 which mesh with the gears, such as the mating gears 32, 6, are formed by the collars 41, 51 fitted on the pin bodies 40, 50. When the first pins 4 and the second pins 5 mesh with the mating gears 32, 6, slipping of the tooth faces can be absorbed through rotation of the collars 41, 51, and highly efficient meshing can be achieved.

Furthermore, in the planetary gear mechanism of the speed reducer 1 of this embodiment, backlash of the meshing faces can be easily adjusted by adjusting the outside diameters of the collars 41, 51. Namely, the working cost can be advantageously reduced.

In addition, in the planetary gear mechanism of the speed reducer 1 of this embodiment, the reaction force applied radially inwards to each of the internally toothed gears of the two gear sets, from its mating gear, acts on the insert portion 71 of the output shaft 7, via the oscillating face plate 3, the first support bearing 81, the increased-diameter portion 21 of the input shaft 2, and the second support bearing 82. Namely, the force with which the internally toothed gear 4, 6 and the externally toothed gear 32, 5 mesh with each other in each of the gear sets is used without loss.

(Speed Reduction Ratio)

In the first embodiment, the number of teeth of the first externally toothed gear (the gear 32 at the outer periphery of the disc portion 31 of the oscillating face plate 3), that of the first internally toothed gear (the gear formed by the pins 4), that of the second externally toothed gear (the gear formed by the pins 5), and that of the second internally toothed gear (the internally toothed gear 6) are indicated in TABLE 1.

TABLE 1

|  | First Embodiment | First Modified Example | Second Modified Example |
|---|---|---|---|
| z1 | 29 | 29 | 28 |
| z2 | 30 | 30 | 29 |
| z3 | 24 | 25 | 26 |
| z4 | 23 | 24 | 25 |
| Reduction Ratio | 116 | 145 | 242.67 |

Figure 5:
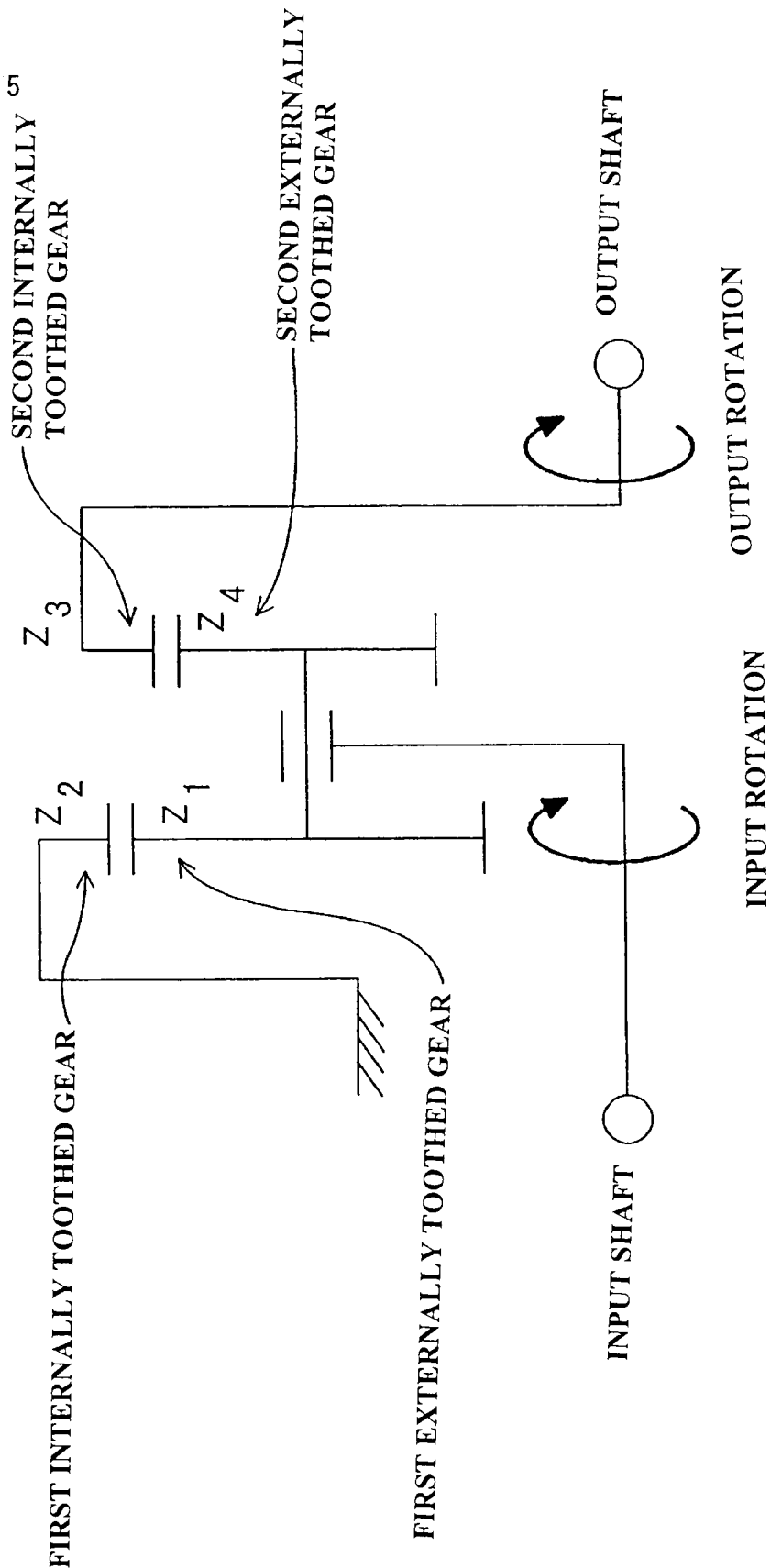
FIG. 5 is a schematic view showing the construction of the speed reducer of the first embodiment.

The speed reducing mechanism of the speed reducer 1 of the first embodiment is schematically illustrated in FIG. 5. The reduction ratio is obtained from the numbers of teeth of the respective gears, according to the mathematical expression as indicated below.

$$\text{Reduction Ratio:} \frac{n_{in}}{n_{out}} = \frac{z_1 z_3}{z_1 z_3 - z_2 z_4} \quad [\text{Eq. 1}]$$

Here, z2 is the number of teeth of the first internally toothed gear, z1 is the number of teeth of the first externally toothed gear, z4 is the number of teeth of the second externally toothed gear, and z3 is the number of teeth of the second internally toothed gear. Also, $n_{in}$ is the rotational speed of the input shaft 2, and $n_{out}$ is the rotational speed of the output shaft 7.

It can be confirmed that the speed reducer 1 of the first embodiment, in which the numbers of teeth of the respective gears are those as indicated in TABLE 1, is able to reduce the speed of rotation of the motor M at such a large reduction ratio as 116.00.

In the speed reducer 1 of the first embodiment, if the number of teeth of the second externally toothed gear and the number of teeth of the second internally toothed gear are respectively increased by one (z3 is equal to 25, and z4 is equal to 24), the reduction ratio becomes equal to 145.00, which is further larger than that in the case of the first embodiment. This example is also indicated as a first modified example in TABLE 1.

Also, if the number of teeth of the first externally toothed gear and that of the first internally toothed gear are respectively reduced by one, and the number of teeth of the second externally toothed gear and that of the second internally toothed gear are respectively increased by one, as compared with those of the first modified example, (z1 is equal to 28, z2 is equal to 29, z3 is equal to 26, and z4 is equal to 25), the reduction ratio becomes equal to 242.67, which is further larger than that of the first modified example. The above example is also indicated as a second modified example in TABLE 1.

As described above, in the planetary gear mechanism of the speed reducer 1 of this embodiment, the speed reduction ratio can be easily adjusted by changing the number of teeth of each gear. Namely, a large reduction ratio can be advantageously achieved, even with the simple construction.

The number of teeth of each of the gears that constitute the respective gear sets is not particularly limited, but a combination of the numbers of teeth, which provides a reduction ratio to be established by the speed reducer 1, can be selected as appropriate.

<Modified Example of First Embodiment>

In the above-described embodiment, the first externally toothed gear and the second internally toothed gear are trochoid type gears, and the first internally toothed gear and the second externally toothed gear are formed by pins. However, any of the combinations of the gears as indicated in TABLE 2 below may be selected provided that each set of meshing gears is a combination of pins and a trochoid type gear.

TABLE 2

|  | First Embodiment | Third Modified Example | Fourth Modified Example | Fifth Modified Example |
|---|---|---|---|---|
| First Internally Toothed Gear | pins | hypotrochoid tooth profile | hypotrochoid tooth profile | pins |
| First Externally Toothed Gear | epitrochoid tooth profile | pins | pins | epitrochoid tooth profile |
| Second Externally Toothed Gear | pins | epitrochoid tooth profile | pins | epitrochoid tooth profile |
| Second Internally Toothed Gear | hypotrochoid tooth profile | pins | hypotrochoid tooth profile | pins |

As described above, the speed reducer 1 of each embodiment or example reduces the speed of rotation of the motor M using a small-sized device. Namely, the planetary gear mechanism of the invention is preferably used in, in particular, a small-sized robot, or the like.

<Another Modified Example of First Embodiment>

In the above-described embodiment, the gear mechanism of the invention is applied to the speed reducer 1 that transmits driving force of the motor M applied to the input shaft 2, to the output shaft 7, while reducing its speed. However, the gear mechanism may be applied to a speed increasing device that transmits driving force applied to the output shaft 7, to the input shaft 2, while increasing its speed.

<Second Embodiment>

Figure 6:
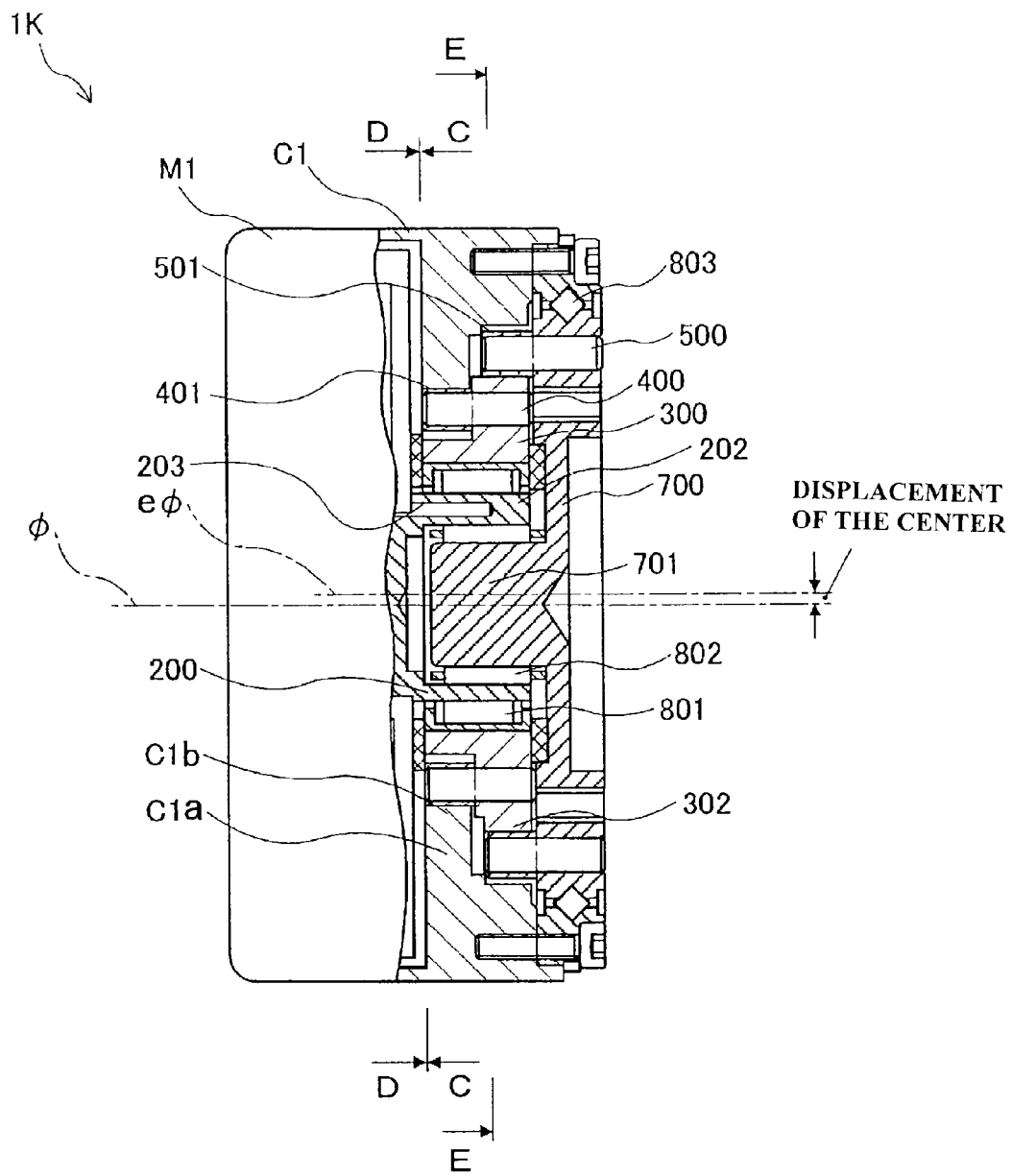
FIG. 6 is a cross-sectional view showing the construction of a speed reducer of a second embodiment.

Next, a speed reducer 1K according to a second embodiment will be described in terms of its differences from the speed reducer 1 as described above, with reference to FIG. 6 through FIG. 9. As shown in FIG. 6, a case C1 (corresponding to the first member of the invention) of a motor M1 (corresponding to the electric motor of the invention) is formed integrally with a housing of the speed reducer 1K. The case C1 also serves as the housing of the speed reducer 1K, and rotatably supports an output shaft 700 (corresponding to the second member of the invention) via an output shaft supporting bearing 803 (corresponding to the third support bearing of the invention).

Also, an output shaft 200 (corresponding to the third member of the invention and the output shaft of the electric motor) protrudes from the motor M1, and the output shaft 200 is formed integrally with the input shaft of the speed reducer 1K so as to also serve as the input shaft. An eccentric portion 202 having an output circumferential surface whose center is displaced from the axis of the input and output shafts (denoted by φ in the drawings) is formed at a distal end portion of the output shaft 200. An insert portion 701 of the output shaft 700 is inserted into a space formed radially inwardly of the eccentric portion 202, and a second support bearing 802 is interposed between an inner circumferential surface of the eccentric portion 202 and the insert portion 701.

Figure 7:
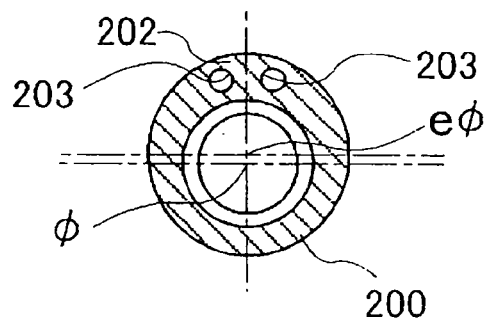
FIG. 7 is a cross-sectional view taken along a C-C section of FIG. 6.

A counter balancer 203 is formed in the output shaft 200 so as to cancel out unbalanced rotation caused by the eccentric portion 202 of the output shaft 200. The counter balancer 203 consists of weight reducing holes formed by partially hollowing the output shaft 200. The weight reducing holes are formed at the same circumferential position as a large-weight portion of the eccentric portion 202 where the outer circumferential surface protrudes radially outwards from the center that lies on the axis of the input and output shafts (as shown in FIG. 7).

An oscillating face plate 300 is mounted on the outer circumferential surface of the eccentric portion 202 of the output shaft 200 via a first support bearing 801. The oscillating face plate 300 (corresponding to the oscillating member of the invention) is formed to be able to oscillate along with the eccentric portion 202 when the output shaft 200 rotates about the axis of the input and output shafts.

Figure 8:
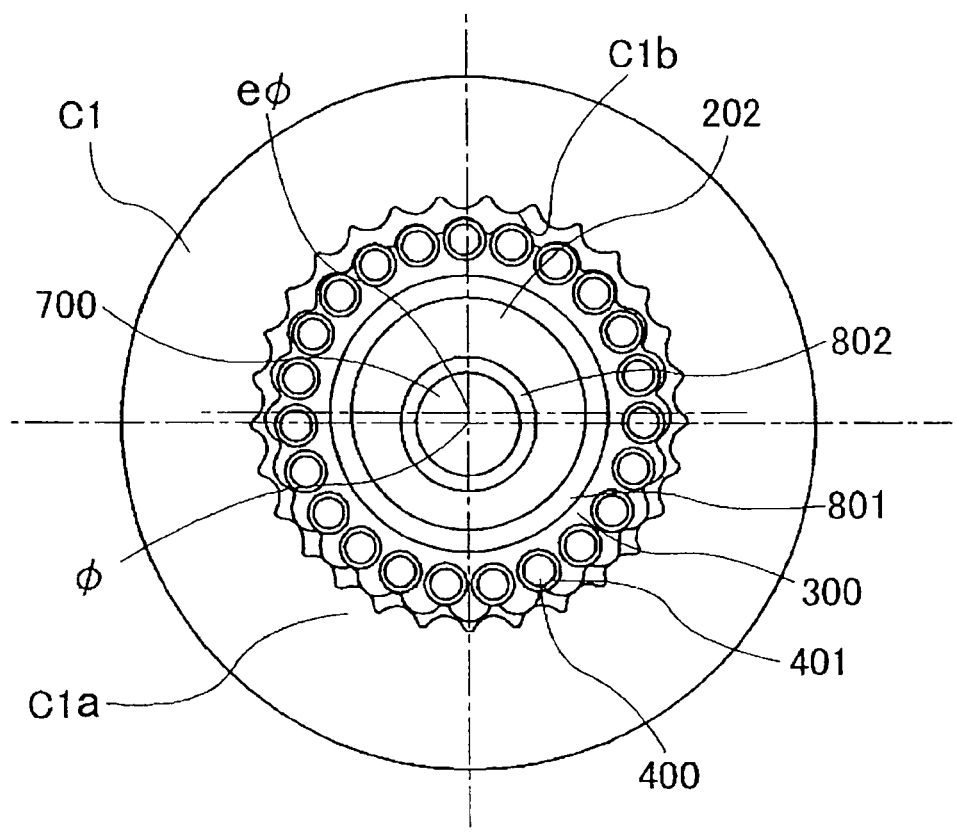
FIG. 8 is a cross-sectional view taken along a D-D section of FIG. 6.

From one side face of an outer peripheral portion of the oscillating face plate 300, 23 first pins 400 protrude toward the motor M1 in the direction of the axis of the input and output shafts. A collar 401 is mounted on a distal end portion of each of the first pins 400. The distal end portions of the first pins 400 form a first externally toothed gear similar to that of the first embodiment (as shown in FIG. 8).

The case C1 of the motor M1 is formed with a support portion C1a that extends radially inwards, and an internally toothed gear C1b similar to that of the first embodiment is provided on the inner circumferential surface of the support portion C1a. The internally toothed gear C1b includes 24 teeth, namely, the number of teeth of the internally toothed gear C1b is larger by one than that of the first externally toothed gear, and forms a hypotrochoid type first internally toothed gear similar to that of the first embodiment. A circumferential portion of the internally toothed gear C1b meshes with the distal end portions of the first pins 400, via the collars 401, (to form a first gear set).

Figure 9:
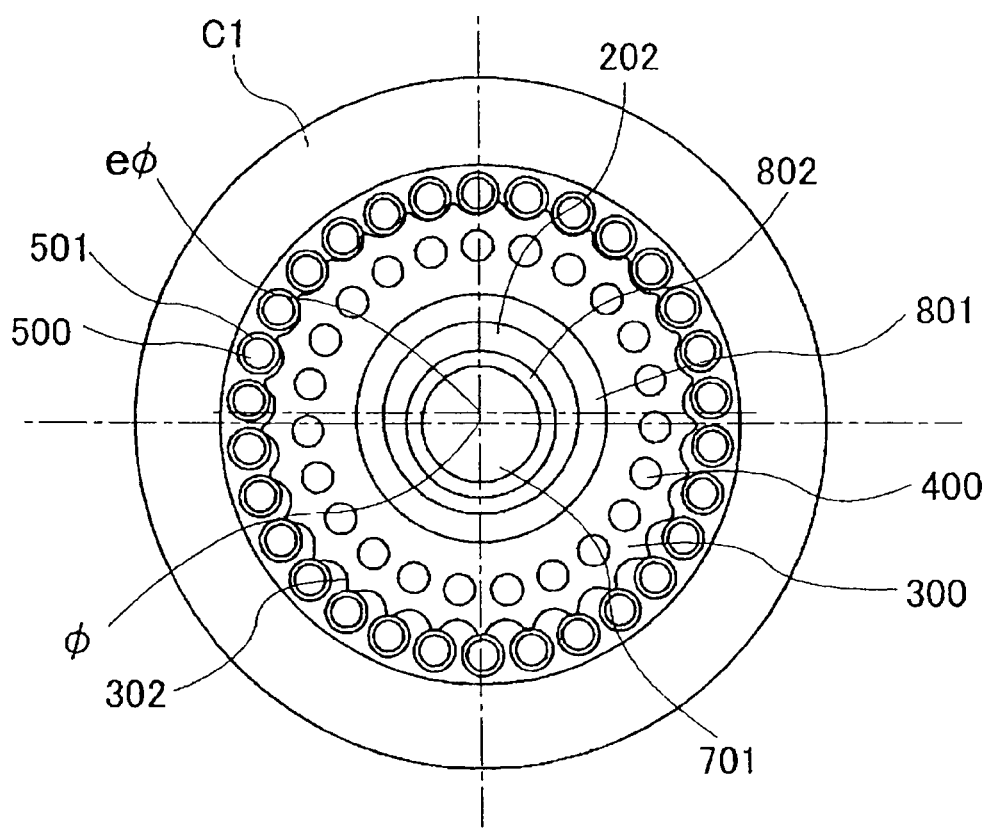
FIG. 9 is a cross-sectional view taken along an E-E section of FIG. 6.

On the other hand, 30 second pins 500 protrude from one side face of the output shaft 700 toward the motor M1 in the direction of the axis of the input and output shafts. A collar 501 is mounted on a distal end portion of each of the second pins 500. The distal end portions of the second pins 500 are located so as to be opposed in radial directions to the outer periphery of the oscillating face plate 300, to form a second internally toothed gear similar to that of the first embodiment (as shown in FIG. 9).

Also, an epitrochoid type externally toothed gear 302 similar to that of the first embodiment is provided on the outer circumferential surface of the oscillating face plate 300. The externally toothed gear 302 includes 29 teeth, namely, the number of teeth of the externally toothed gear 302 is smaller by one than that of the second internally toothed gear, and forms a second externally toothed gear similar to that of the first embodiment. A circumferential portion of the externally toothed gear 302 meshes with the distal end portions of the second pins 500, via the collars 501, (to form a second gear set).

The other features in construction are similar to those of the speed reducer 1 according to the first embodiment, and therefore, further explanation will not be provided.

Next, the operation of the speed reducer 1K will be described. When the motor M1 is operated, the output shaft 200 rotates. As the output shaft 200 rotates, the eccentric portion 202 that constitutes the output shaft 200 rotates eccentrically. The eccentric rotation of the eccentric portion 202 causes the oscillating face plate 300 to make oscillating motion (eccentrically oscillating motion) via the first support bearing 801, and also rotate the oscillating face plate 300 about the eccentric axis.

As the oscillating face plate 300 makes rotary motion while oscillating, the first externally toothed gear and second externally toothed gear provided on the oscillating face plate 300 also make rotary motion while oscillating. At this time, only a circumferential portion of the first pins 400 (the first externally toothed gear) meshes with the internally toothed gear C1b (the first internally toothed gear), and the circumferential position at which the first externally toothed gear and the first internally toothed gear mesh with each other moves due to oscillating and rotary motions of the oscillating face plate 300, so that the speed of rotation of the oscillating face plate 300 about the eccentric axis is reduced. The oscillating face plate 300 rotates in a direction opposite to the direction of rotation of the output shaft 200. The speed reduction ratio is determined by the numbers of teeth of the first externally toothed gear and first internally toothed gear that mesh with each other.

The oscillating face plate 300 whose rotational speed has been reduced is formed with the externally toothed gear 302 (the second externally toothed gear), which eccentrically oscillates and rotates along with the oscillating face plate 300. The externally toothed gear 302 meshes with the second pins 500 (the second internally toothed gear), and the circumferential position at which the second pins 500 and the externally toothed gear 302 mesh with each other moves, so that the speed of rotation of the output shaft 700 on which the second pins 500 are provided is (relatively) reduced, due to the difference in the number of teeth. This is similar to the reduction of the speed in the first gear set consisting of the first externally toothed gear and the first internally toothed gear as described above. The output shaft 700 rotates in a direction opposite to the direction of rotation of the oscillating face plate 300. As a result, further reduced-speed rotation about the axis of the input and output shafts is taken out or produced at the output shaft 700.

According to the second embodiment, the first externally toothed gear is formed by the first pins 400 that protrude from the oscillating face plate 300. Therefore, the first internally toothed gear that meshes with the first externally toothed gear can be formed in the case C1 by cutting; thus, the first internally toothed gear can be formed by cutting through a wall (the support portion C1a) of the case C1 as the housing, resulting in easy production thereof.

Also, the second internally toothed gear is formed by the second pins 500 that protrude from the output shaft 700. When the second internally toothed gear is formed on the output shaft 700, therefore, the output shaft 700 need not be formed by machining with a pocket or a hollow portion, resulting in easy production thereof.

Also, the counter balancer 203 consists of weight reducing holes formed by partially hollowing the output shaft 200; therefore, the eccentric imbalance load of the output shaft 200 can be eliminated without increasing the number of components.

Also, the inner ring of the output shaft supporting bearing 803 is formed integrally with the output shaft 700; therefore, the number of components can be reduced, and the planetary gear mechanism is available at a reduced cost.

Also, the case C1 of the motor M1 is formed integrally with the housing of the speed reducer 1K, and the output shaft 200 of the motor M1 is formed integrally with the input shaft of the speed reducer 1K. This arrangement makes it possible to eliminate the input shaft supporting bearing 80 shown in the first embodiment, and thus reduce the number of components, so that the speed reducer 1K is available at a reduced cost.

<Modified Examples of Second Embodiment>

The inner ring of the output shaft supporting bearing 803 is not necessarily formed integrally with the output shaft 700, but an inner ring may be provided independently of the output shaft 700.

In the speed reducer 1K, the output shaft 700 may be nonrotatably fixed, and the case C1 may be rotatable about the axis of the input and output shafts. Also, the output shaft 700 and the case C1 may be both rotatable about the axis of the input and output shafts, and reduced-speed rotation may be delivered at a given ratio to the output shaft 700 and the case C1, respectively.

In the speed reducer 1 of the first embodiment, weight reducing holes serving as the counter balancer 23 may be provided in the input shaft 2.

In the speed reducer 1 of the first embodiment, the inner ring of the output shaft supporting bearing 83 may be formed integrally with the output shaft 7.

In the speed reducer 1 of the first embodiment, the input shaft 2 may be formed integrally with the rotary shaft MJ of the motor M, and the housing H may be formed integrally with the case of the motor M.

Explanation of Reference Numerals

1, 1K: Speed Reducer 2: Input Shaft 20: Reduced-diameter Portion 21: Increased-diameter Portion 22, 202: Eccentric Portion 23, 203: Counter Balancer 3, 300: Oscillating Face Plate 30: Cylindrical Portion 31: Disc Portion 32, 302: Externally Toothed Gear 4, 400: First Pin 40: Pin Body 41, 401: Collar 5, 500: Second Pin 50: Pin Body 51, 501: Collar 6, C1b: Internally Toothed Gear 7, 700: Output Shaft 70: Disc-shaped Portion 71, 701: Insert Portion 80: Input Shaft Supporting Bearing 81, 801: First Support Bearing 82, 802: Second Support Bearing 83, 803: Output Shaft Supporting Bearing 200: Output Shaft C1: Case M, M1: Motor $\phi$: Axis of Input and Output Shafts e$\phi$: Eccentric Axis

The invention claimed is:

1. A planetary gear mechanism comprising:
a first member having a first internally toothed gear formed on an inner circumferential surface thereof;
a second member that has a second internally toothed gear formed on an inner circumferential surface thereof, and is rotatable relative to the first member about an axis of input and output shafts;
an oscillating member that is formed in an annular shape, and includes a first externally toothed gear that is formed on an outer circumferential surface thereof to be able to mesh with the first internally toothed gear, and a second externally toothed gear that is formed on the outer circumferential surface to be able to mesh with the second internally toothed gear, such that the number of teeth of the first externally toothed gear is smaller than the number of teeth of the first internally toothed gear, and the number of teeth of the second externally toothed gear is smaller than the number of teeth of the second internally toothed gear, the oscillating member being formed so as to oscillate relative to the first member and the second member, so that only a circumferential portion of the first externally toothed gear meshes with the first internally toothed gear, and only a circumferential portion of the second externally toothed gear meshes with the second internally toothed gear; and
a third member including an eccentric portion having an outer circumferential surface whose center is displaced from the axis of the input and output shafts, said eccentric portion supporting an inner circumferential surface of the oscillating member and rotating about the axis of the input and output shafts so as to oscillate the oscillating member, or being rotated about the axis of the input and output shafts due to oscillation of the oscillating member,
wherein driving force is applied to the third member to oscillate and rotate the oscillating member, and move a circumferential position at which the first externally toothed gear and the first internally toothed gear mesh with each other, and a circumferential position at which the second externally toothed gear and the second internally toothed gear mesh with each other, so that the driving force is delivered at a reduced speed to at least one of the first member and the second member, or
driving force is applied to at least one of the first member and the second member so as to move a circumferential position at which the first externally toothed gear and the first internally toothed gear mesh with each other, and a circumferential position at which the second externally toothed gear and the second internally toothed gear mesh with each other, and oscillate and rotate the oscillating member, so that the driving force is delivered at an increased speed to the third member;
a part of the second member is inserted in a central portion of the third member; and
a second support bearing is disposed between the third member and said part of the second member inserted in the third member.

2. The planetary gear mechanism according to claim 1, wherein a central axis of the first externally toothed gear and a central axis of the second externally toothed gear are provided on the same axis.

3. The planetary gear mechanism according to claim 1, wherein a first support bearing is disposed between the eccentric portion and the oscillating member.

4. The planetary gear mechanism according to claim 1, wherein the second support bearing is disposed between the eccentric portion of the third member and said part of the second member inserted in the third member.

5. The planetary gear mechanism according to claim 1, wherein the planetary gear mechanism is a speed reducing mechanism in which the third member serves as the input shaft, and the second member serves as the output shaft.

6. The planetary gear mechanism according to claim 1, wherein:
the second member is rotatably supported by the first member via a third support bearing; and
an inner ring of the third support bearing is formed integrally with the second member.

7. The planetary gear mechanism according to claim 1, wherein:
the third member is driven by an electric motor;
a case of the electric motor is formed integrally with the first member or the second member; and
an output shaft of the electric motor is formed integrally with the third member.

8. The planetary gear mechanism according to claim 1, wherein one of the second externally toothed gear and the second internally toothed gear comprises second pins that extend in a direction of the axis of the input and output shafts.

9. The planetary gear mechanism according to claim 8, wherein each of the second pins has a pin body, and a collar rotatably fitted on the pin body.

10. The planetary gear mechanism according to claim 1, wherein the third member has a counter balancer that cancels out unbalanced rotation of the eccentric portion.

11. The planetary gear mechanism according to claim 10, wherein the counter balancer includes a weight reducing hole formed by partially hollowing the third member.

12. The planetary gear mechanism according to claim 1, wherein one of the first externally toothed gear and the first internally toothed gear comprises first pins that extend in a direction of the axis of the input and output shafts.

13. The planetary gear mechanism according to claim 12, wherein the other of each of the externally toothed gears and each of the internally toothed gears is formed with a trochoid tooth profile.

14. The planetary gear mechanism according to claim 12, wherein each of the first pins has a pin body, and a collar rotatably fitted on the pin body.

15. The planetary gear mechanism according to claim 12, wherein:
the first member is a housing that rotatably supports the second member and the third member;
the second member is the output shaft that delivers driving force applied to the third member, at a reduced speed; and
the first internally toothed gear is formed by the first pins that protrude from the first member, and the second externally toothed gear is formed by the second pins that protrude from the oscillating member.

16. The planetary gear mechanism according to claim 12, wherein:
the first member is a housing that rotatably supports the second member and the third member;
the second member is the output shaft that delivers driving force applied to the third member, at a reduced speed; and
the first externally toothed gear is formed by the first pins that protrude from the oscillating member, and the second internally toothed gear is formed by the second pins that protrude from the second member.

17. An planetary gear mechanism comprising:
a fixed housing that supports an input shaft and an output shaft such that the input shaft and the output shaft are rotatable about a common axis of the input and output shafts;
a first shaft that is one of the input shaft and the output shaft, and has an eccentric portion whose center lies on an eccentric axis that is displaced from the axis of the input and output shafts;
a second shaft that is the other of the input shaft and the output shaft, and is provided with a second internally toothed gear; and
an oscillating member that is formed with a cylindrical portion supported by the eccentric portion, a first externally toothed gear that engages with a first internally toothed gear formed on the housing and has a center on the axis of the input and output shafts, and a second externally toothed gear that engages with the second internally toothed gear, such that the number of teeth of the first externally toothed gear is smaller than the number of teeth of the first internally toothed gear, and the number of teeth of the second externally toothed gear is smaller than the number of teeth of the second internally toothed gear, the oscillating member being formed so as to rotate with respect to the eccentric axis and oscillate relative to the housing and the second shaft, so that only a circumferential portion of the first externally toothed gear meshes with the first internally toothed gear, and only a circumferential portion of the second externally toothed gear meshes with the second internally toothed gear, wherein:
the first internally toothed gear comprises first pins that protrude from the housing and extend in a direction of the axis of the input and output shafts;
the second externally toothed gear comprises second pins that protrude from the oscillating member and extend in the direction of the axis of the input and output shafts;
driving force is applied to the first shaft to oscillate and rotate the oscillating member, and move a circumferential position at which the first externally toothed gear and the first internally toothed gear mesh with each other and a circumferential position at which the second externally toothed gear and the second internally toothed gear mesh with each other, so that the driving force is delivered at a reduced speed to the second shaft, or
driving force is applied to the second shaft to move a circumferential position at which the first externally toothed gear and the first internally toothed gear mesh with each other and a circumferential position at which the second externally toothed gear and the second internally toothed gear mesh with each other, and oscillate and rotate the oscillating member, so that the driving force is delivered at an increased speed to the first shaft;
a part of the second shaft is inserted in a central portion of the first shaft; and
a second support bearing is disposed between the first shaft and said part of the second shaft inserted in the first shaft.

18. An planetary gear mechanism comprising:
a fixed housing that supports an input shaft and an output shaft such that the input shaft and the output shaft are rotatable about a common axis of the input and output shafts;
a first shaft that is one of the input shaft and the output shaft, and has an eccentric portion whose center lies on an eccentric axis that is displaced from the axis of the input and output shafts;
a second shaft that is the other of the input shaft and the output shaft, and is provided with a second internally toothed gear; and
an oscillating member that is formed with a cylindrical portion supported by the eccentric portion, a first externally toothed gear that engages with a first internally toothed gear formed on the housing and has a center on the axis of the input and output shafts, and a second externally toothed gear that engages with the second internally toothed gear, such that the number of teeth of the first externally toothed gear is smaller than the number of teeth of the first internally toothed gear, and the number of teeth of the second externally toothed gear is smaller than the number of teeth of the second internally toothed gear, the oscillating member being formed so as to rotate with respect to the eccentric axis and oscillate relative to the housing and the second shaft, so that only a circumferential portion of the first externally toothed gear meshes with the first internally toothed gear, and only a circumferential portion of the second externally toothed gear meshes with the second internally toothed gear, wherein:
the first externally toothed gear comprises first pins that protrude from the oscillating member and extend in a direction of the axis of the input and output shafts;
the second internally toothed gear comprises second pins that protrude from the second shaft and extend in the direction of the axis of the input and output shafts;
driving force is applied to the first shaft to oscillate and rotate the oscillating member, and move a circumferential position at which the first externally toothed gear and the first internally toothed gear mesh with each other and a circumferential position at which the second externally toothed gear and the second internally toothed gear mesh with each other, so that the driving force is delivered at a reduced speed to the second shaft, or
driving force is applied to the second shaft to move a circumferential position at which the first externally toothed gear and the first internally toothed gear mesh with each other and a circumferential position at which the second externally toothed gear and the second internally toothed gear mesh with each other, and oscillate and rotate the oscillating member, so that the driving force is delivered at an increased speed to the first shaft;

a part of the second shaft is inserted in a central portion of the first shaft; and a second support bearing is disposed between the first shaft and said part of the second shaft inserted in the first shaft.

* * * * *